Nov. 25, 1941.  N. E. APPLE  2,264,156
EGG COOLING APPARATUS
Filed Jan. 9, 1939  5 Sheets-Sheet 1

Inventor
Nelson Everett Apple
By J. L. Walker
Attorney

Nov. 25, 1941.   N. E. APPLE   2,264,156
EGG COOLING APPARATUS
Filed Jan. 9, 1939   5 Sheets-Sheet 2
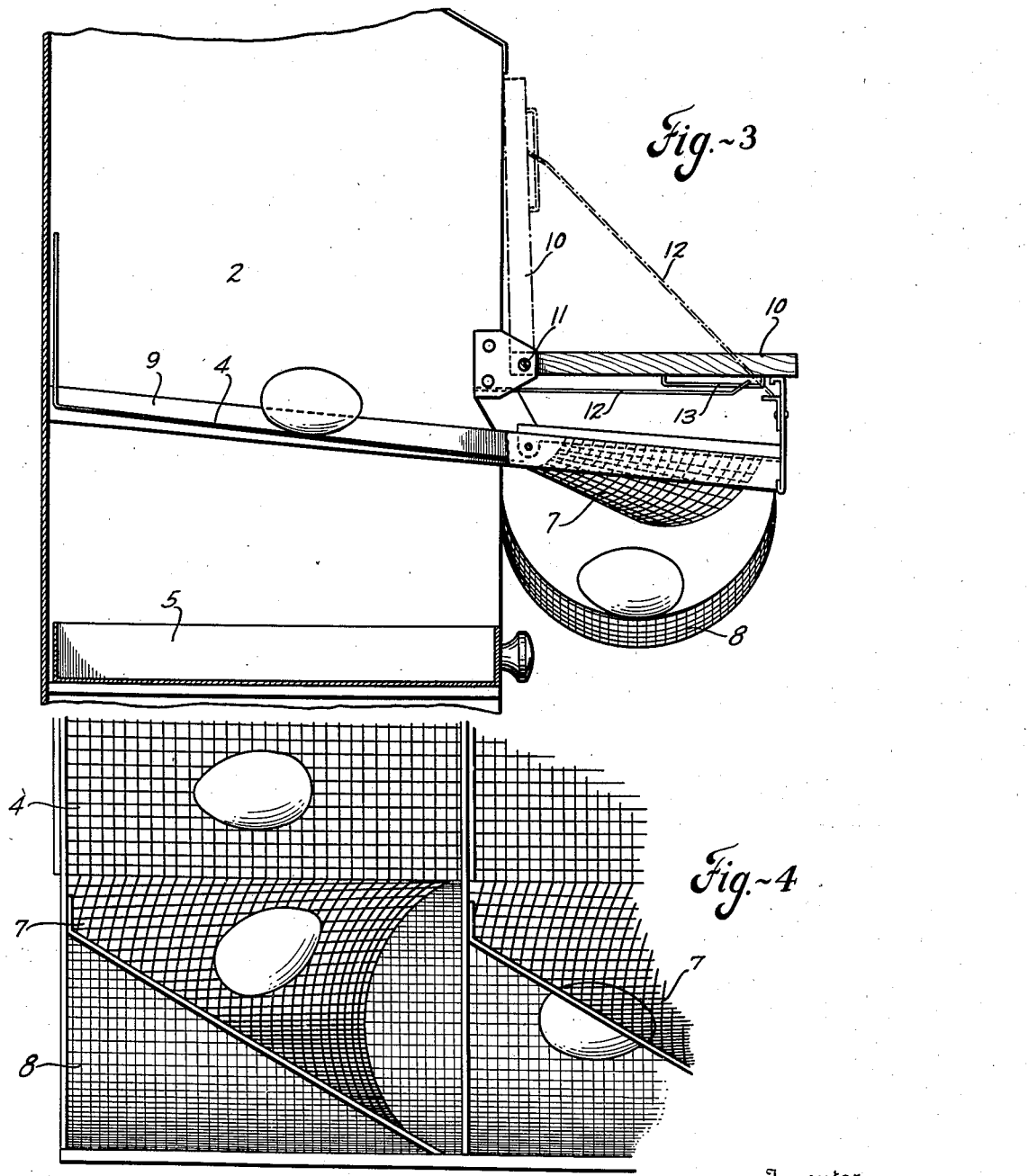

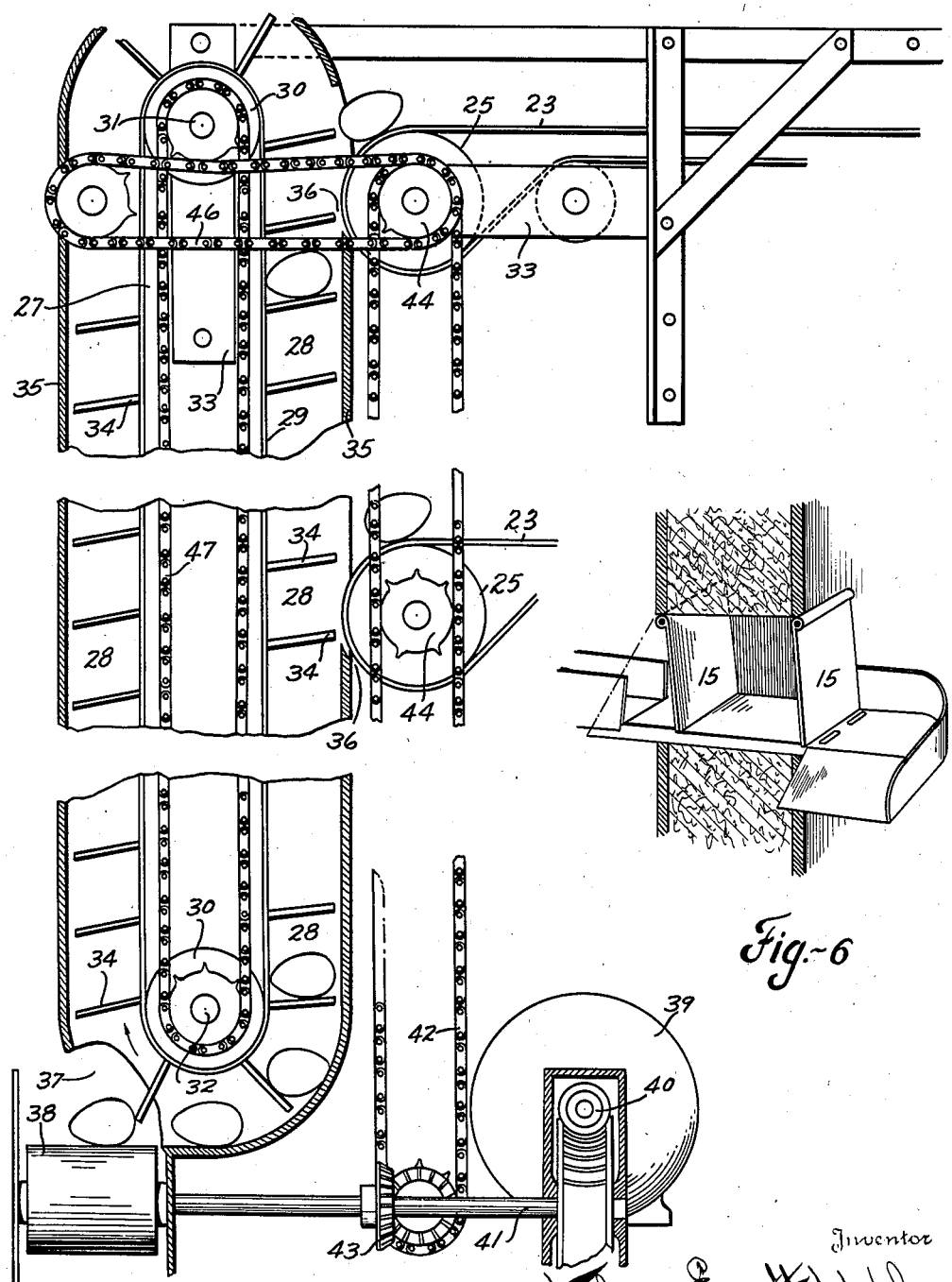

Nov. 25, 1941. N. E. APPLE 2,264,156
EGG COOLING APPARATUS
Filed Jan. 9, 1939 5 Sheets-Sheet 5
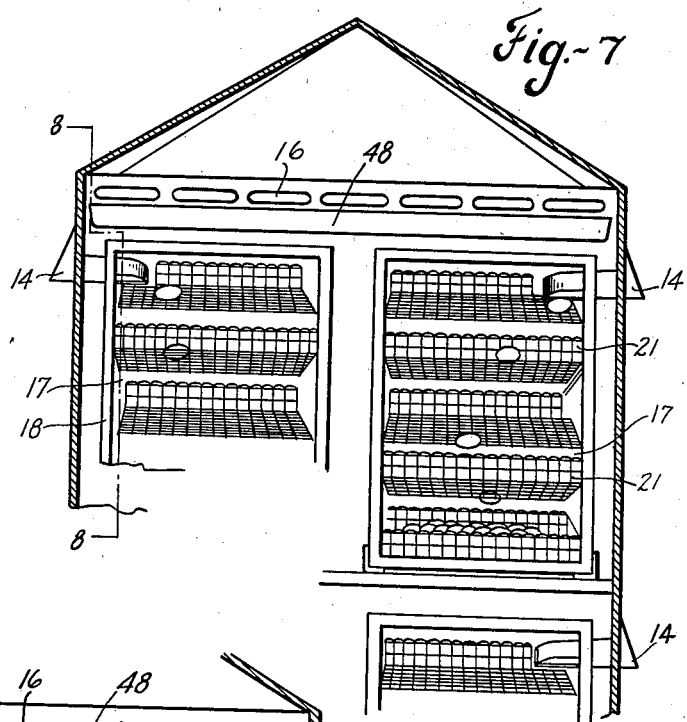
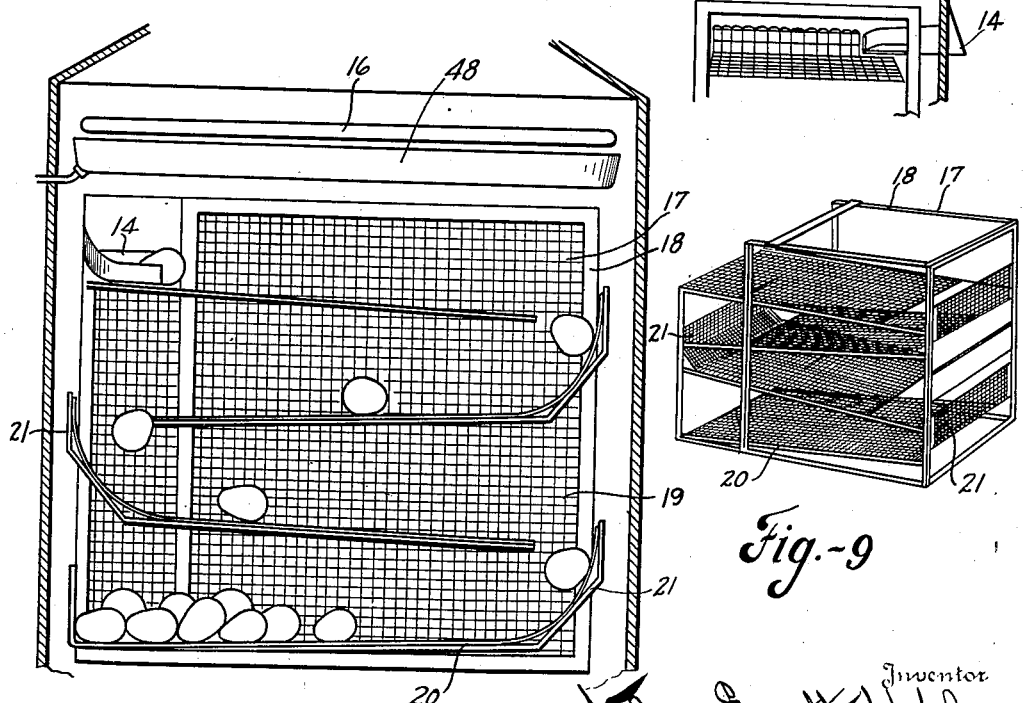

Patented Nov. 25, 1941

2,264,156

UNITED STATES PATENT OFFICE 2,264,156

EGG COOLING APPARATUS

Nelson Everett Apple, Covington, Ohio, assignor of one-half to Walter H. Mader, Covington, Ohio Application January 9, 1939, Serial No. 249,959

1 Claim. (Cl. 119—48)

This invention pertains to food preservation, and more particularly to a method of egg cooling and storage and an apparatus for automatically transferring newly laid eggs into an air conditioned compartment wherein they are rapidly cooled and maintained under such temperature and humidity conditions as to preserve their original freshness and high quality.

An egg begins to deteriorate almost immediately that it is laid. Unless the animal heat is quickly extracted, the yolk of the egg becomes darkened and cloudy or somewhat red in color. Eggs, if fertile, will germinate at a temperature of sixty-nine degrees, causing spots to appear in the yolk. The contents of a newly laid egg completely fill the shell. However, unless proper conditions of humidity are maintained, a void or air cell begins to form almost immediately, due to shrinkage or evaporation of the contents of the egg. In an old, improperly conditioned egg such air cell will occupy approximately one-fourth to one-third of the shell capacity.

Ordinary commercial eggs, if stored under improper conditions, although palatable and marketable, when broken do not stand up but tend to be watery and the whites fall.

The physical changes which occur in improperly conditioned eggs, quite soon after they are laid, affect their flavor. While they will remain edible and commercially marketable for a considerable period of time without special treatment, there is, however, a marked difference of flavor between newly laid and commercial eggs.

Egg connoisseurs and restaurants and hotels catering to the higher class trade are quite willing to pay increased prices for such newly laid eggs, which are known in the trade as "specials."

The present invention provides for immediate transfer of newly laid eggs from the laying nests directly into a storage compartment wherein they are subject to proper temperature and humidity conditions such as to maintain qualities and characteristics of freshly laid eggs. The refrigerated temperature condition is not sufficiently low to be equivalent to "cold storage" and the eggs subjected to the present treatment are in no sense "cold storage" eggs. The temperature is, however, sufficiently low to effect rapid dissipation of the animal heat and sufficiently below the germination point to prevent germination of fertile eggs. The humidity conditions are sufficiently high within the storage compartment to prevent evaporation and shrinkage of the egg contents, and so preserve its original condition.

Newly laid eggs are surface coated with a moist excretion which, as it dries, tends to seal the shell. While the present purpose is to deposit the newly laid eggs as quickly as possible in a moisture and temperature controlled storage compartment, it is also desirable to allow sufficient time interval for drying of the moist surface of the egg shell.

In the present embodiment of the invention there is contemplated a battery of laying nests, from which the eggs are conveyed to the temperature and moisture controlled storage compartment as rapidly as laid, either by gravity through screen conveyor troughs or by traveling conveyors, during which period they are subjected to drying influence of atmospheric air. Within the temperature controlled compartment the eggs are deposited in a series of baskets and automatically transferred from one to another until all are filled.

The primary object of the invention is to preserve the original condition and freshness of flavor of the newly laid eggs.

A further object is to provide in combination with poultry laying nests a conditioning compartment to which the eggs are automatically transferred immediately upon their deposit in the nests.

A further object of the invention is to provide an improved assembly of laying nests and refrigerated storage compartment with intermediate conveyor means for transferring the eggs automatically from the nests to the storage compartment.

A further object of the invention is to provide ventilated conveyor means by which the eggs may be air dried before reaching the storage compartment.

A further, but none the less important, object of the invention is to provide an improved method for preserving the original flavor of freshly laid eggs.

A further object of the invention is to provide a method and apparatus for subjecting newly laid eggs to rapid extraction of animal heat.

Further important objects of the invention are to improve the sanitary conditions, by keeping the eggs clean, without washing, brushing or polishing, which destroys the natural surface of the egg. It also materially reduces the incidental labor and attendance by eliminating egg gathering. By immediate removal, breakage of eggs in the nests is prevented. The use of wire bottom nests prevents broodiness of the hens and increases egg production. Also, by scratching on the wire bottom as she enters the nest, the hen cleans her feet, which contributes greatly to preserving cleanliness of the eggs.

By the present method of immediately transferring newly laid eggs into a temperature and humidity conditioned compartment where the animal heat is rapidly extracted while maintaining the egg temperature well above "cold storage" level but below germinating temperature, and the evaporation of the contents minimized by proper humidity conditioning, every newly laid egg is given the possibility of being and remaining a high quality egg, provided the hens have been properly fed.

A further object of the invention is to provide improved egg preserving and storage apparatus having the herein mentioned advantageous structural features and inherent meritorius characteristics.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

Referring to the accompanying drawings, wherein is shown the preferred but obviously not necessarily the only form of embodiment of the invention, Fig. 1 is a diagrammatic perspective view of two batteries of laying nests and an intermediate cold storage compartment into which the newly laid eggs are automatically deposited.

Fig. 3 is a vertical section of one of the laying nests showing the relation of the delivery chute and conveyor and also the alighting board and conveyor guard.

Fig. 4 is a fragmentary top plan view of portions of the nest and egg delivery conveyor.

Fig. 6 is a detail sectional view of the vestibule entrance from the egg conveyor into the storage compartment.

Fig. 7 is a vertical sectional view of the upper portion of the refrigerated storage compartment showing several receiving racks therein.

Fig. 8 is a vertical sectional view at right angles to Fig. 7, illustrating a portion of the storage compartment and a receiving rack therein.

Fig. 9 is a perspective view of one of the storage racks removed from the storage compartment.

Fig. 12 is a detail view partly broken away of a modified form of the traveling conveyor system including an elevator.

Like parts are indicated by similar characters of reference throughout the several views.

Figure 1:
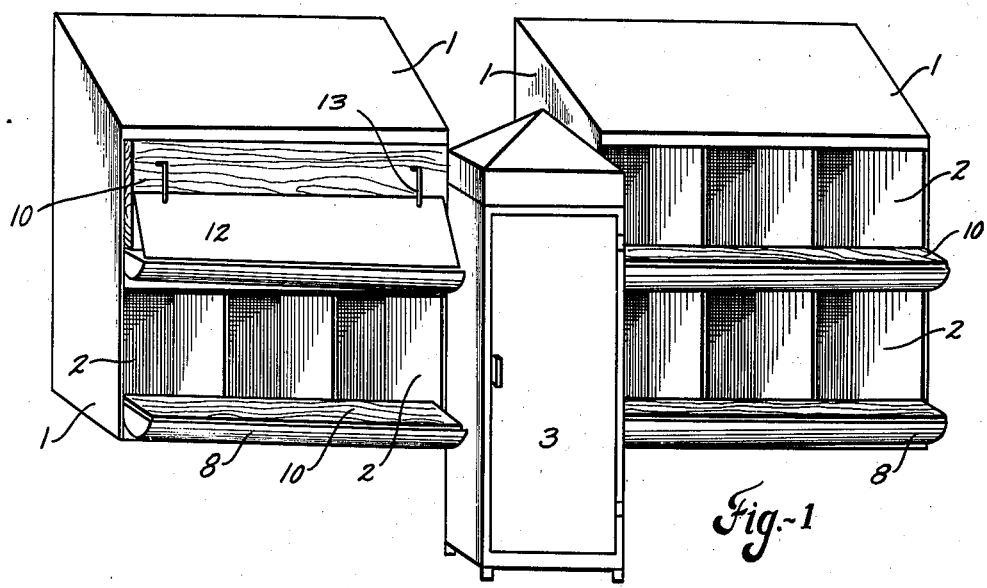
Figure 2:
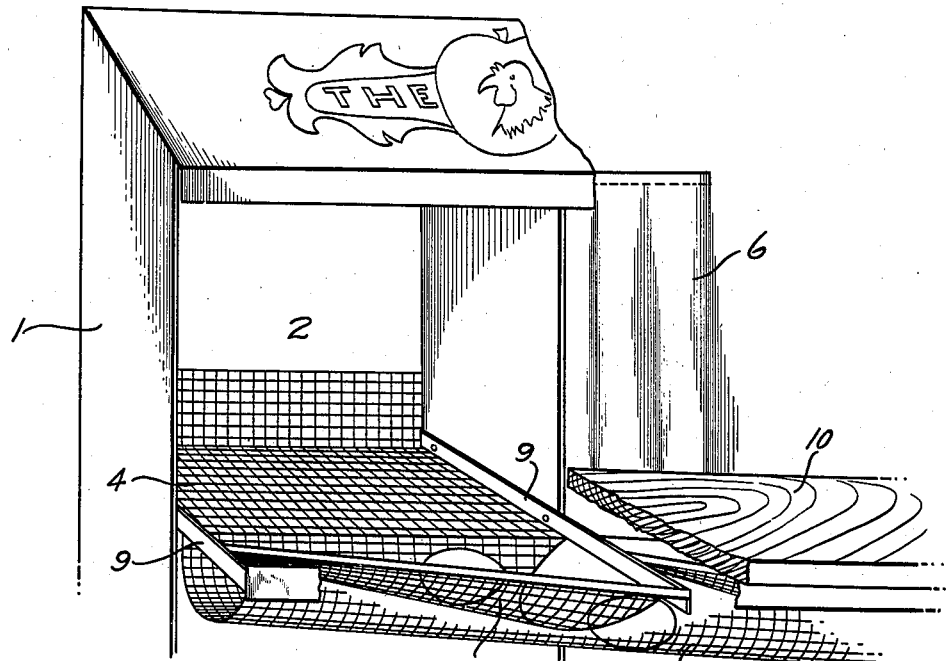
Fig. 2 is a perspective view of one of the nests showing the delivery chute discharging into the gravity conveyor.

The present apparatus is designed for use in commercial poultry houses where eggs are produced in commercial quantities, and is intended to supply a most exacting demand for eggs of highest quality and finest flavor.

Referring to the drawings, 1—1 illustrate batteries of laying nests, each of which comprises multiple nest compartments 2—2. Such batteries 1 may be extended to any desired length, and the nest compartments 2 may be disposed in a greater or lesser number of tiers. Intermediate the respective nest batteries 1—1 is the storage compartment 3 into which the eggs are automatically transferred and maintained under low temperature conditions.

The nests, per se, may be of any desired construction from which the eggs will discharge automatically. For illustrative purposes, but with no intent to unduly limit the scope or application of the invention, they are herein shown as cubicles having wire mesh elevated bottoms 4 upon which the hen cleans her feet by scratching before settling on the nest. The dirt and refuse thus freed from her feet falls through the screen bottom 4 onto a sub-bottom or floor 5, from which it can be removed to the front.

Since laying hens are inclined to be secretive and much prefer laying their eggs in darkened surroundings, each nest compartment or cubicle 2 is provided with a dependent curtain or drape 6, which may be pushed aside by the entering hen. The wire mesh nest bottom 4 is slightly inclined so that the deposited egg will roll by gravity forwardly from the nest bottom into a tapered wire mesh delivery chute 7. A delivery chute 7 is provided for each nest compartment. Enclosing the delivery chutes 7 and common to all the nests of each tier of the battery is a wire mesh conveyor trough 8. Both the delivery chutes and the conveyor trough are supported in an angle bar frame 9 in which they are inclined to the horizontal at such degree that the deposited eggs will roll by gravity through the chute 7 into the conveyor 8 and thence through the inclined conveyor trough under succeeding nest delivery chutes 7 into the storage compartment 3.

Disposed over the conveyor trough, as a cover therefor, is an alighting board 10, hinged at its inner margin at 11 for upward swinging movement into vertical position in front of the nest openings. This alighting board affords during the day an entry or vestibule to the nests to facilitate the entry of the hens to the nests and at the same time prevents deposits of refuse in the chutes and conveyor troughs. At night when turned to its vertical position, as shown in Fig. 3, the alighting board forms a closure to keep the hens from roosting in the nests. A plate 12 of sheet metal, slidingly connected with the board 10 by wire loops 13, engages with the supporting frame 9 in an inclined position as shown by dotted lines in Fig. 3. This serves to support the board 10 in its upright position and at the same time covers the conveyor trough in such relation as to prevent the hens roosting on the conveyor or delivery chutes and excludes refuse and debris therefrom at night.

At their delivery ends the conveyor troughs 8 communicate with short entry conduits 14 which project both exteriorly and interiorly of the sides of the storage cabinet 3, and intercommunicate through the insulated wall thereof and discharge laterally into receiving racks therein. The inlets 14 are provided with yielding closures or spaced swinging doors 15, which are displaced by the pressure of the entering egg but which resume their normal positions after the egg has passed and afford therebetween a dead air space to exclude warm air from the compartment.

The storage cabinet 3 may be of any suitable size, preferably, however, proportionate to the size of the nest batteries 1. In the present instance it is shown of sufficient size to contain a separate storage rack for each tier of nests of the respective batteries. Thus, in the illustrated assembly the storage cabinet 3 contains four storage racks, arranged side by side in pairs, with one pair above the other. The walls of the storage cabinet are thermally insulated to minimize heat leakage.

Within the top of the storage cabinet is a refrigerant evaporator or cooling coil 16 connected with a compressor condenser unit (not shown). Such refrigerating apparatus is of conventional character, as commonly employed in electrically operated domestic refrigerators. The refrigerating apparatus is so operated as to maintain within the storage compartment 3 a substantially uniform temperature of approximately forty-six to fifty degrees Fahrenheit, but may be maintained at lower or higher temperature, as necessitated by market requirements and weather conditions.

The storage racks 17 are removably insertable within the storage cabinet and interchangeable when filled with other racks of similar character. Each rack comprises a frame 18, preferably of light angle bar construction having wire mesh side walls 19. The sides are of hardware cloth of relatively large mesh. Half inch mesh is suitable, but inch mesh may be employed. Intermediate the side walls 19 are a series of vertically spaced, slightly inclined shelves 20, in somewhat staggered overlapping relation, each being curved upwardly at 21 at its higher end in spaced relation with the lower end of the next higher shelf. These basket or tray-like shelves are also preferably, although not necessarily, formed of wire mesh cloth.

In constructing these storage trays, as well as the delivery chutes 7 and conveyor troughs 8, a relatively large mesh screen material of one quarter to one-half inch mesh is used for strength. However, on such material the eggs do not roll freely but tend to settle on open meshes of the material, and further, the heavier material is somewhat rigid and there is more danger of breakage. However, this difficulty is overcome by lining the several surfaces, to wit, the delivery chutes 7, the conveyor troughs 8, and the storage trays 20, with a much finer mesh screen cloth such as ordinarily used for fly screens. The smaller mesh cloth supports the eggs more uniformly across the larger open meshes of the heavier material and, being more resilient and flexible and since it does not conform exactly to the shape of the heavier material, affords a cushion effect.

Figure 5:
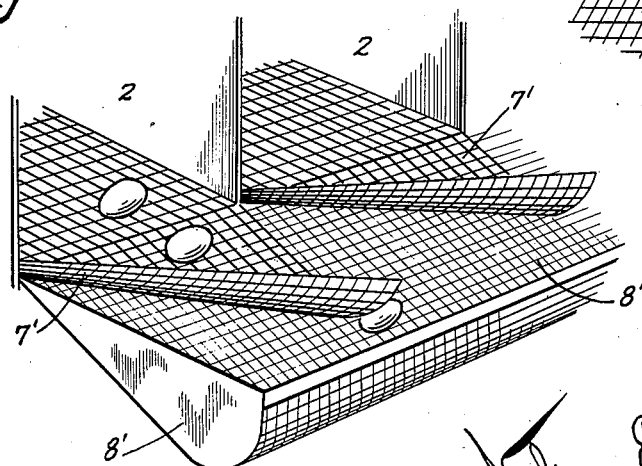
Fig. 5 is a perspective view of a variation of the egg delivery conveyor or chute from its preferred form.
Figure 10:
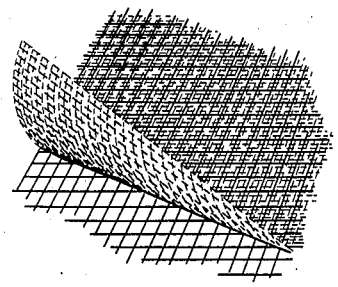
Fig. 10 is a perspective view of a fragmentary portion of the duplex wire screen cloth employed in construction of the storage racks and egg conveyors.

The form of gravity conveyor or chute shown in Fig. 5 is preferred. While the general construction and mode of operation are quite similar to that shown in Figs. 3 and 4, it differs therefrom by being laterally inclined as well as longitudinally inclined. The width of the main conveyor 8' is somewhat greater than the individual delivery chute 7'. The eggs roll to the outer side of the conveyor trough 8' and are enabled to pass beyond the chutes 7' as they progress down the trough 8', whereas in Figs. 3 and 4 the eggs must pass beneath the auxiliary chutes 7. The preferred Fig. 5 construction enables the chutes 7' to be continued into contact or merging relation with the common conveyor trough 8'. Hence there is no drop of the eggs from the end of the chute into the conveyor as is the case in the Fig. 3 and 4 construction. In the Fig. 5 construction the chutes 7' are in effect triangular flaps, the inner portions of which coincide with the inclined bottom of the conveyor trough 8' in parallel substantially contacting relation therewith, while the outer margins are rolled upwardly in diagonal relation to direct the rolling egg down the conveyor trough.

The eggs deposited from the conveyor 8 into the storage cabinet 3 are first received at the higher end of the topmost tray or basket of the related storage rack and roll by gravity down the inclined surface of the tray or basket and fall thence into the upturned end of the next succeeding tray. The eggs roll to and fro from one tray to another until they come to rest in the lowermost unfilled tray. While it might be expected that at least some of the eggs would be broken enroute to the lower storage trays, such is not the fact. The several inclines, including the delivery chutes, the conveyor troughs and the storage tray bottoms, are disposed at such gradient that the eggs will roll by gravity, but at such relatively low speed that all damage is avoided. Their fall from the outlet of the discharge chutes 7 into the conveyor 8 and from one tray into another is so short and so cushioned by the fine mesh linings that no breakage occurs during normal operation. The storage racks are independently removable from the cabinet 3 and when filled are interchanged with like empty racks.

Figure 11:
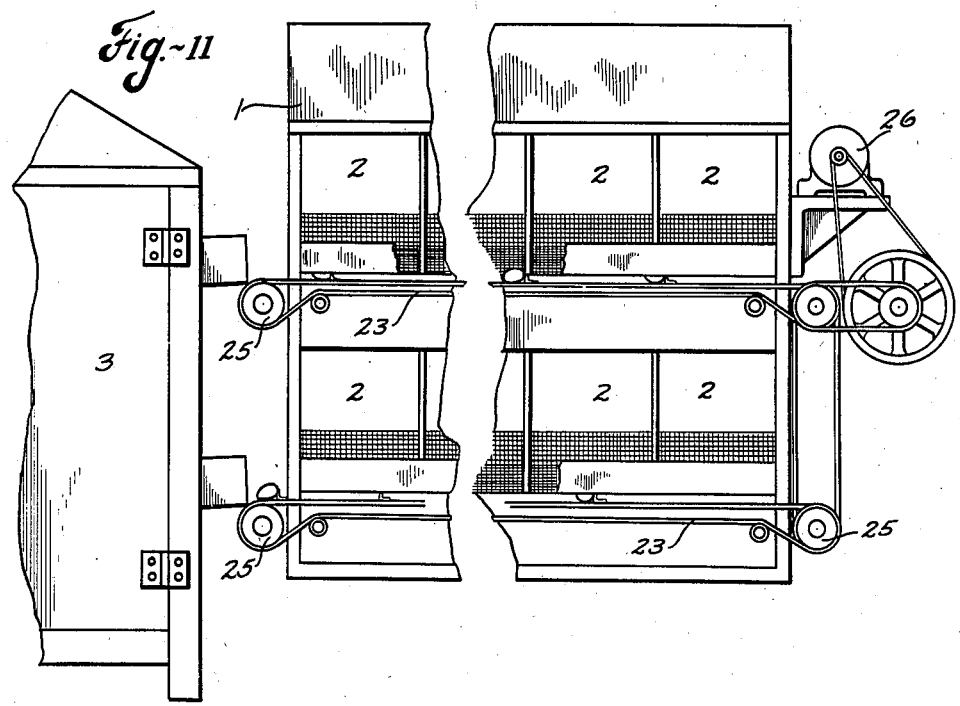
Fig. 11 is a front elevation of an installation of greater size and capacity illustrating the use of traveling conveyors for transferring the eggs from the nests to the storage compartment.

While the gravity transfer of eggs from the nests to the storage cabinet is quite satisfactory for ordinary commercial poultry farms having nest batteries of moderate size, for larger commercial installations wherein the eggs would acquire too great momentum and wherein necessary inclination of long conveyors would interfere with nests of a lower tier, traveling belt conveyors 23 are provided as illustrated in Fig. 11. The conveyors are disposed in front of and below the level of each tier of nests and are common to the several discharge chutes 7 of nests of the entire tier. The conveyor belts 23 are preferably of webbing and are mounted on pulleys 25, one of which is actuated through a reduced speed drive by a motor 26. They discharge directly into the short chutes or conveyors 14 leading to the interior of the storage chamber. Instead of continuous travel motion of the belt conveyors, they are preferably intermittently operated by a suitable timing device which will automatically turn the motor on and off periodically.

It is contemplated that in large poultry establishments wherein several different flocks of hens may be housed on different floors of a poultry house, there may be several batteries of nests on each floor. The eggs collected therefrom on traveling belts 23, as illustrated in Fig. 11, are discharged into a common elevator or vertical conveyor as illustrated in Fig. 12, by which the eggs are carried to a common refrigerated storage compartment on a lower or upper floor as may be desired. The horizontal egg collecting conveyors 23, of which there may be any desired number, discharge into a common endless traveling elevator or vertical conveyor 27. The elevator 27 is provided with a continuous succession of egg receiving pockets 28. The elevator comprises an endless belt 29 passing over guide pulleys 30 at its upper and lower ends. The pulleys 30 are mounted on shafts 31 and 32 journaled in a suitable supporting structure 33 in which are also journaled the guide pulleys 25 over which the horizontal collecting belts travel. The elevator belt 28 carries a plurality of relatively spaced, wide, shelf-like vanes 34 which define the intermediate pockets 28 and support the eggs in their descent. The elevator travels within an enclosure or shield 35, which retains the traveling eggs within the pockets 29. This housing 35 has openings 36 coincident with the different horizontal collecting conveyors 23 through which eggs are received into the elevator. At its bottom there is an outlet opening 37 through which the eggs are received from the elevator onto a conveyor belt 38, by which they are in turn delivered into the refrigerated storage compartment, wherever it may be located.

The entire conveyor system is driven from a motor 39 by a speed reduction gearing 40 through a shaft 41 which may be directly connected with the off-take conveyor 38. A drive chain 42, driven by a sprocket connected by gears 43 with the shaft 41, drives a sprocket 44 on the shaft of the pulley 25 pertaining to the top conveyor 23. It also has driving engagement with drive sprockets 44 of other horizontal collecting conveyors 23. A second sprocket on the shaft of the upper conveyor pulley 25 is connected by a drive chain 46 with a sprocket upon the shaft 31 of the upper elevator pulley 30 and actuates the elevator in timed relation with the collecting conveyors. To insure uniform travel of the elevator and relieve the belt 28 of driving strain, the upper and lower elevator shafts 31 and 32 are preferably, although not necessarily, interconnected by a drive chain 47. The belt 29 and the pockets 28 are made sufficiently wide to accommodate several eggs side by side, so that in the event one of the collecting conveyors presents an egg at a pocket into which one or more eggs have already been discharged from other conveyors it will nevertheless be received therein. However, if the pocket is full and can not accommodate another egg, the egg being presented will be held back temporarily and the conveyor belt 23 may travel thereunder until an empty pocket comes opposite the conveyor into which the egg will be discharged.

Although the refrigerated compartment has been illustrated of relatively small size, and as accommodating only four removable storage racks, it is to be understood that it may be made of any desired dimensions and may accommodate a large number of filled and partially filled racks. As fast as racks are filled with eggs deposited from the conveyors, such racks may be withdrawn from the egg receiving positions and replaced with other empty racks, while the filled racks are transferred elsewhere in the refrigerated compartment for storage under proper temperature and humidity conditions.

To maintain suitable humidity conditions with the storage compartment there is provided a water pan 48 immediately beneath the refrigerating coils 16 in the top of the compartment. This pan receives the water of condensation from the coils and additional water is added thereto as may be required. Humidity is maintained at approximately 80 degrees. The preferred temperature is 46° to 50° F., at which degree two to two and a half hours are required to extract the animal heat and clear the yolks.

Such degree of humidity is found to be sufficient under ordinary conditions to maintain the moisture content of the eggs. The shell of a newly laid egg is completely full. However, if exposed to atmosphere, evaporation begins almost immediately and an air cell forms inside the shell which continues to grow until the contents are reduced quite materially. By supplying ample moisture within the compartment evaporation is retarded and the moisture content of the eggs maintained constant.

Eggs will germinate at 69° F., which is below ordinary room temperature, and will incubate at 104° F., which is well under known summer temperatures. Consequently, if unprotected, eggs deteriorate quite rapidly, although still deemed commercial.

By the herein described method the eggs may be maintained in their initial condition of freshness for quite some time, and if maintained under like conditions during transit to market will afford eggs of high quality to the trade.

While for illustrative purposes the air conditioning of the egg storage compartment has been described as a cooling or refrigerating effect for lowering the temperature thereof, it is to be understood that for winter operation or for use in especially cold localities it may be necessary to warm the storage compartment, in which case warm water or other heating medium may be circulated through the heat exchange unit 16.

The primary object is to maintain the storage temperature within a predetermined range sufficiently low to dissipate the animal heat and prevent germination, but sufficiently high to prevent freezing or other deleterious effects of extremely low temperature. Therefore, the heat exchange unit 16 may be either a cooling or a heating unit, as external temperature conditions may necessitate, and the air conditioning of the storage compartment herein mentioned is to be deemed to be maintenance of such temperature and moisture conditions as will best preserve and retain the desirable characteristics of newly laid eggs.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claim.

Having thus described my invention, I claim:

In an apparatus wherein freshly laid eggs are collected and subjected to preservation treatment substantially immediately upon deposit thereof by fowls, a storage cabinet having a plurality of entrance openings, yielding closures for the openings automatically closing the openings after passage of an egg therethrough, a plurality of removable receiving racks in the cabinet into which the eggs are received through said entrance openings, refrigerating means and humidifying means within the cabinet, a plurality of conveyors discharging through the entrance openings into the cabinet, and a plurality of nests common to each conveyor and discharging thereinto eggs laid in the nests for conveyance by the conveyor to an entrance to said cabinet and thence into a removable receiving rack therein.

NELSON EVERETT APPLE.